(12) United States Patent
Andrejczyk et al.

(10) Patent No.: US 12,049,830 B2
(45) Date of Patent: Jul. 30, 2024

(54) INLET SYSTEM WITH AN INBOARD DRAIN ASSEMBLY FOR A ROTORCRAFT ENGINE

(71) Applicant: LOCKHEED MARTIN CORPORATION, Bethesda, MD (US)

(72) Inventors: Robert J. Andrejczyk, Sandy Hook, CT (US); William DiMaggio, Trumbull, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 116 days.

(21) Appl. No.: 17/727,564

(22) Filed: Apr. 22, 2022

(65) Prior Publication Data
US 2023/0340895 A1 Oct. 26, 2023

(51) Int. Cl.
*F01D 25/32* (2006.01)
*B64D 33/02* (2006.01)

(52) U.S. Cl.
CPC ............. *F01D 25/32* (2013.01); *B64D 33/02* (2013.01)

(58) Field of Classification Search
CPC ........ F01D 25/24; F01D 25/32; B64C 1/1453
See application file for complete search history.

(56) References Cited

U.S. PATENT DOCUMENTS

| | | | | |
|---|---|---|---|---|
| 5,285,636 A * | 2/1994 | Mayo | ................... | B64D 1/16 244/129.1 |
| 5,552,576 A * | 9/1996 | Giamati | ................ | B64D 11/02 244/136 |
| 5,996,938 A * | 12/1999 | Simonetti | ............. | B64C 1/1453 244/129.1 |
| 8,820,045 B2 * | 9/2014 | DeDe | ................... | F01D 11/005 60/800 |
| 9,358,410 B2 | 6/2016 | Jullie et al. | | |
| 10,017,238 B2 * | 7/2018 | Leon | ...................... | F01D 25/32 |
| 10,589,833 B2 | 3/2020 | Walters | | |
| 2006/0273224 A1 * | 12/2006 | Hoffjann | ............... | B64C 1/1453 244/136 |
| 2013/0327059 A1 * | 12/2013 | Richardson | ........... | B64C 1/1453 60/797 |
| 2015/0197346 A1 * | 7/2015 | Jullie | .................... | B64C 1/1453 244/129.2 |
| 2016/0009358 A1 * | 1/2016 | Gaudreau | .............. | B64D 41/00 244/136 |
| 2017/0122128 A1 * | 5/2017 | Lacko | ..................... | F01D 25/32 |
| 2018/0363789 A1 * | 12/2018 | Nguyen | .................. | E21B 43/26 |

* cited by examiner

*Primary Examiner* — Woody A Lee, Jr.
*Assistant Examiner* — Cameron A Corday
(74) *Attorney, Agent, or Firm* — Foley & Lardner LLP

(57) ABSTRACT

A drain assembly includes a drain tube and a flapper assembly. The drain tube extends between a first tube end and a second tube end. The first tube end is configured to fluidly attach to an inlet plenum assembly of an engine system of a rotorcraft. The flapper assembly is positioned along the second tube end and comprises a flapper door that is configured to allow fluid to drain from the drain assembly to an engine compartment of the engine system of the rotorcraft. The flapper door is configured to prevent fluid, engine compartment gases, or flame from flowing into the drain assembly through the second tube end of the drain tube.

22 Claims, 10 Drawing Sheets

INLET SYSTEM WITH AN INBOARD DRAIN ASSEMBLY FOR A ROTORCRAFT ENGINE

FIELD

The present application relates generally to an inlet system with an inboard drain assembly for an engine of a rotorcraft.

BACKGROUND

Rotorcraft turbine engines within a rotorcraft are designed to ingest continuous rain. However, if water accumulates within an inlet of the engine (such as within a plenum area) over time and the water is suddenly ingested by the engine in large quantity, the engine may have a flameout. Water is most likely to accumulate when the engine inlet suction force is lower, such as during idle operation in heavy rain or during water wash. The water is most likely to be ingested in a large quantity (with possible engine flameout) if the engine inlet suction is subsequently increased by operating at higher power. Additionally, accumulated water can freeze, dislodge, and be ingested into the engine in a frozen state, which may potentially damage various rotating engine components.

SUMMARY

To prevent engine flameout or damage from water, rotorcraft turbine engines need to prevent or reduce water accumulation in the engine inlets. Conventional engines route water from low accumulation points in the engine inlet within the engine compartment to overboard drains and to the rotorcraft exterior.

However, draining water to the rotorcraft exterior is problematic for rotorcraft which have intake ducts that extend through engine compartment firewalls to mate with the engine and have low accumulation points at the base of the engine compartment deep inside the rotorcraft fuselage. In such case, draining accumulated water from the engine inlet typically requires drain lines that have a closed path and extend continuously from the engine inlet to overboard at the rotorcraft exterior. These drain lines must have fireproof provisions for transitions through engine compartment fire zones, and typically have a long length and include numerous penetrations through multiple areas of the fuselage structure to reach the rotorcraft exterior. Such configurations are costly, mechanically complex, difficult to repair and maintain, and heavy. Furthermore, the drain lines typically have blind sections that are difficult to inspect and maintain to prevent clogs or damage. The present disclosure addresses these and other issues.

Various embodiments provide for a drain assembly that includes a drain tube and a flapper assembly. The drain tube extends between a first tube end and a second tube end. The first tube end is configured to fluidly attach to an inlet plenum assembly of an engine system of a rotorcraft. The flapper assembly is positioned along the second tube end and comprises a flapper door that is configured to allow fluid to drain from the drain assembly to an engine compartment of the engine system of the rotorcraft. The flapper door is configured to close by force of gravity when fluid is not draining from the drain tube to prevent fluid, engine compartment gases, or flames from flowing into the drain assembly through the second tube end of the drain tube.

Various other embodiments provide for a drain assembly for an inlet plenum assembly of an engine system of a rotorcraft. The drain assembly includes a drain fitting, a drain tube, and a flapper assembly. The drain fitting is configured to fluidly attach to the inlet plenum assembly. The drain tube extends between a first tube end and a second tube end. The first tube end is configured to fluidly attach to the drain fitting. An inner diameter of the drain fitting is smaller than an inner diameter of the drain tube. The flapper assembly is positioned along the second tube end and includes a flapper door allowing fluid drain from the drain tube.

Various other embodiments provide for a method of draining fluid from an inlet plenum assembly of an engine system. The method includes positioning a drain assembly within an engine compartment. The drain assembly includes a drain tube and a flapper assembly. The drain tube extends between a first tube end and a second tube end. The flapper assembly is positioned along the second tube end and includes a flapper door. The method further includes fluidly attaching the first tube end of the drain tube to the inlet plenum assembly such that fluid can drain from within the inlet plenum assembly, through the drain assembly, into the engine compartment, and through at least one floor drain defined by a floor of the engine compartment.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Figure 1:
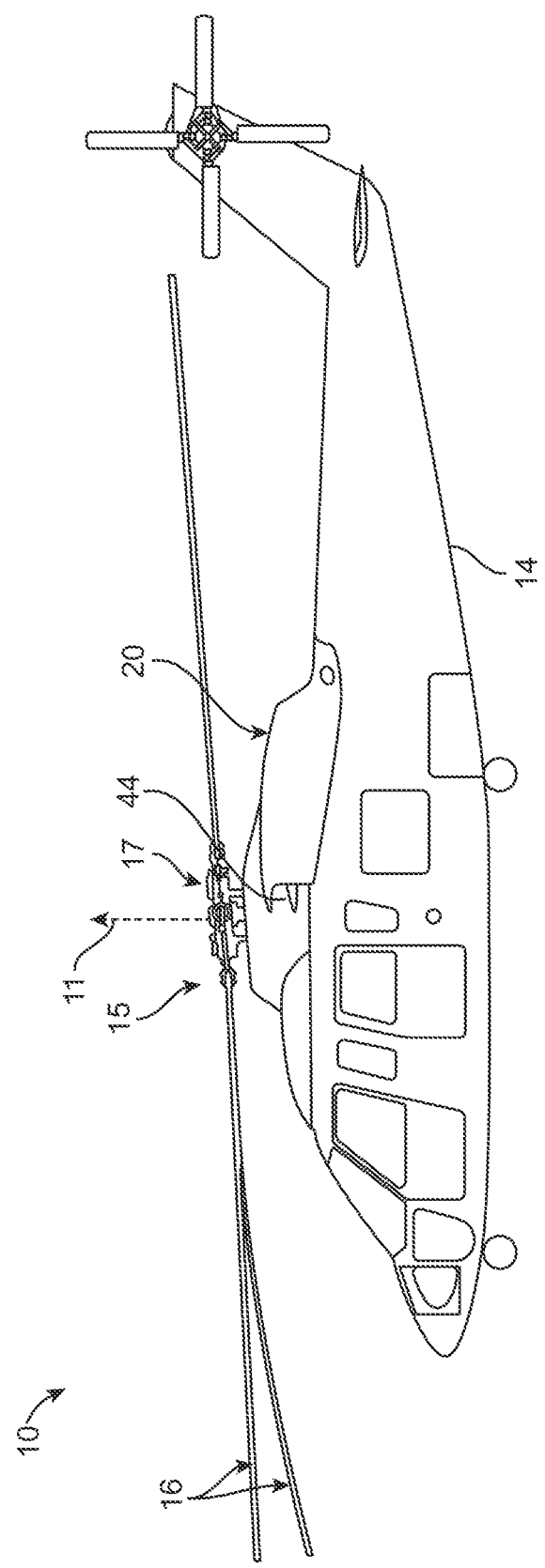
FIG. 1 is a side view of a rotorcraft.

Referring to the figures generally, various embodiments disclosed herein relate to an inboard drain assembly for an inlet system within an engine system of a rotorcraft. As described further herein, exemplary particular configurations of the drain assembly allow accumulated liquid (e.g., inlet water) to be deposited and drained directly into the interior of the engine compartment (rather than draining to an area outside of the engine compartment) and onto the engine compartment floor, thereby flowing to and draining through existing floor drains in the engine compartment of the engine assembly. By depositing the liquid to existing floor drains in the engine compartment (rather than draining overboard), the drain assembly allows for drainage deep within the fuselage from the inlet plenum assembly without adding any new structural fuselage penetrations (which may be omitted entirely or reduced in quantity) to otherwise provide a drain route to the exterior, does not extend through firewalls, and does not require tubing extending throughout the rotorcraft. Accordingly, the configuration of the drain assembly lowers weight and cost and is less obtrusive.

The drain assembly adds a passage from the engine inlet to the engine compartment without affecting the fire zone integrity, the engine compartment cooling integrity, or the engine compartment fire extinguishing integrity. In particular, by including a flapper assembly (as described further herein), the drain assembly is fireproof and maintains the sealed integrity of the firewall boundary of the engine compartment to meet civil certification regulations. For example, the configuration of the drain assembly (in particular the flapper assembly) prevents flames or hot gases from the interior of the engine compartment from passing into the engine inlet, thereby maintaining sealed integrity of the firewall, as described further herein. Due to the flapper assembly, the drain assembly does not affect engine compartment cooling air dynamics or cause inert gas to be evacuated from the engine compartment when fire suppression systems are discharged. Additionally, the various materials (including, but not limited to, stainless steel (such as 321 stainless steel)) used within the drain assembly are fireproof (as well as rustproof and corrosion proof). The flapper assembly is configured to position the flapper door at an angle in the closed position, which keeps the flapper door closed due to the natural force of gravity on the weight of the flapper door whenever liquid is not draining from the drain tube, even with variations in fuselage incline due to pitch up or pitch down flight attitude.

The drain assembly is easy to install, remove, inspect, and maintain within an engine system. This is particularly advantageous since the drain assembly can be retrofit after initial rotorcraft development if a new drainage need arises due to changes to the original inlet system or engine configuration. Since the drain assembly is easily installed, the installation cost of the drain assembly is lower compared to conventional drain assemblies.

Furthermore, since the drain assembly is positioned entirely within (and therefore heated by) the engine compartment, the drain assembly is less susceptible to freezing. Additionally, the feature of having a larger drain tube inner diameter than the drain fitting inner diameter achieves the necessary fluid pressure head draining conditions with a shorter length drain tube compared to if the drain tube and the drain fitting had the same inner diameters. This configuration allows the drain tube to be shorter and to fit more easily within the area where the inlet plenum has a low accumulation point in the engine compartment, which typically has a tight clearance. The short structure of the drain tube is also less susceptible to clogging and easier to inspect.

Rotor System

FIG. 1 illustrates an exemplary rotary wing aircraft or rotorcraft 10 (which may be, for example, a helicopter, a rotorcraft, or a variety of other devices which include at least one rotor blade). The rotorcraft 10 includes a rotorcraft body or airframe 14, a main rotor system 15, a tail rotor system, a transmission, and at least one engine system 20. The overall structure and configuration of the rotorcraft 10 may have a variety of different configurations. The airframe 14 is a non-rotating frame (relative to the main rotor system 15) and supports the main rotor system 15, the transmission, and the engine system 20.

The main rotor system 15 includes a plurality of main rotor blades 16 (e.g., a rotor blade spar) and at least one central rotor hub 17. The main rotor system 15 is driven by the transmission and rotates about a central hub or rotor axis 11. The rotor axis 11 corresponds to the flapwise axis of the rotor blade 16. The rotor system 15 is configured to rotate the rotor hub 17 (and thus also the rotor blades 16) about the rotor axis 11.

The transmission includes the main gearbox driven by one or more engines 22 of the engine system 20. The main gearbox may drive the main rotor system 15. The main gearbox and the engine system 20 may be mounted on the airframe 14 of the rotorcraft 10. Thus, the main gearbox and engine system 20 form part of the overall assembly including airframe 14.

Although a particular rotorcraft configuration is illustrated and described in the disclosed non-limiting embodiment, other configurations and/or machines with rotor systems are within the scope of the present disclosure. It is to be appreciated that while the description herein relates to a rotorcraft with a main rotor system 15 and a tail rotor system, the disclosure herein may be as readily applied to rotorcraft with a variety of different types of rotor systems, such as aircraft with dual coaxial, counter-rotating rotor systems.

Engine System

Figure 2:
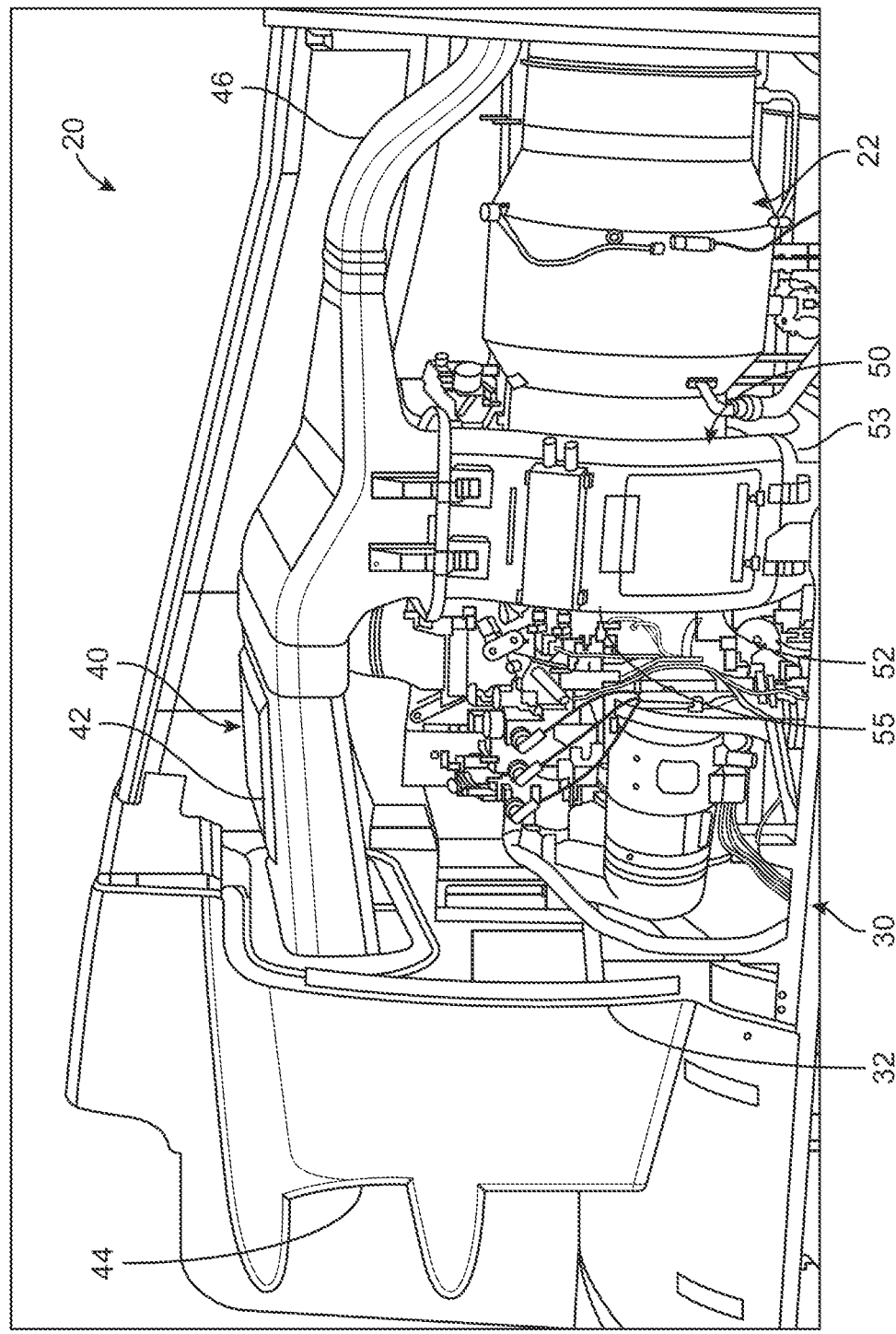
FIG. 2 is a perspective view of an engine system that can be provided within the rotorcraft of FIG. 1 according to one embodiment.

As shown in FIG. 2, the rotorcraft turbine engine system 20 includes one or more engines 22, an engine compartment 30, and an inlet system 40 for the engine 22. The engine 22 is a gas turbine turboshaft engine. The engine 22 is installed within the engine compartment 30 to comply with fire zone requirements.

Figure 5A:
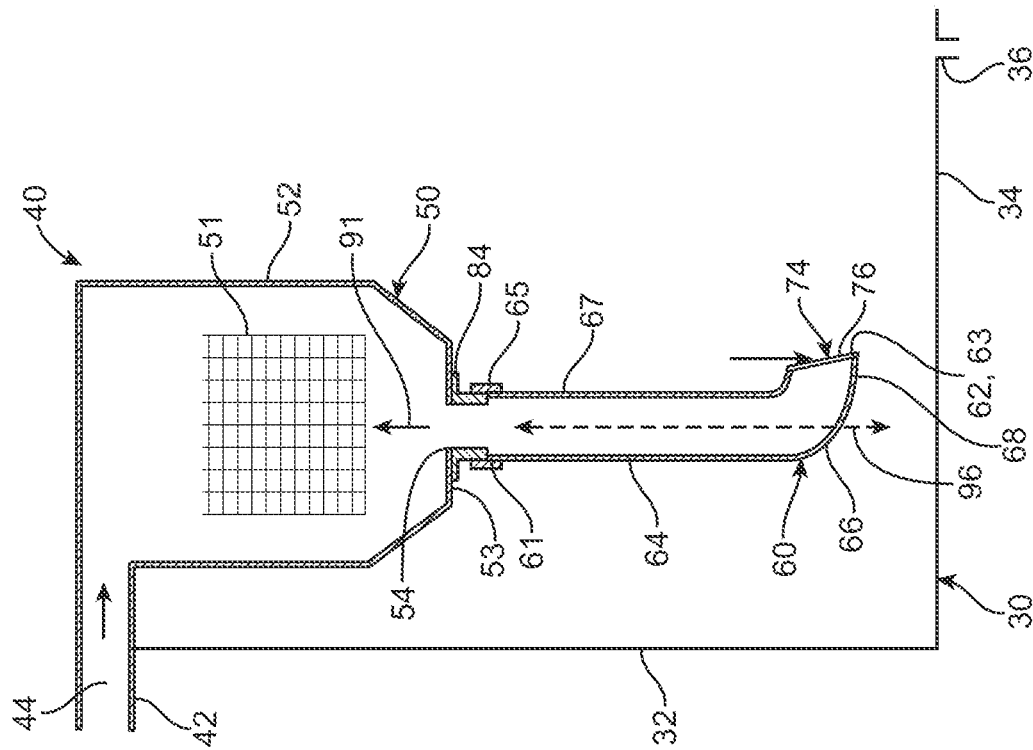
FIG. 5A is a schematic, cross-sectional view of an inlet system and an engine compartment of the engine system of FIG. 2 with a flapper door in an open position.
Figure 5B:
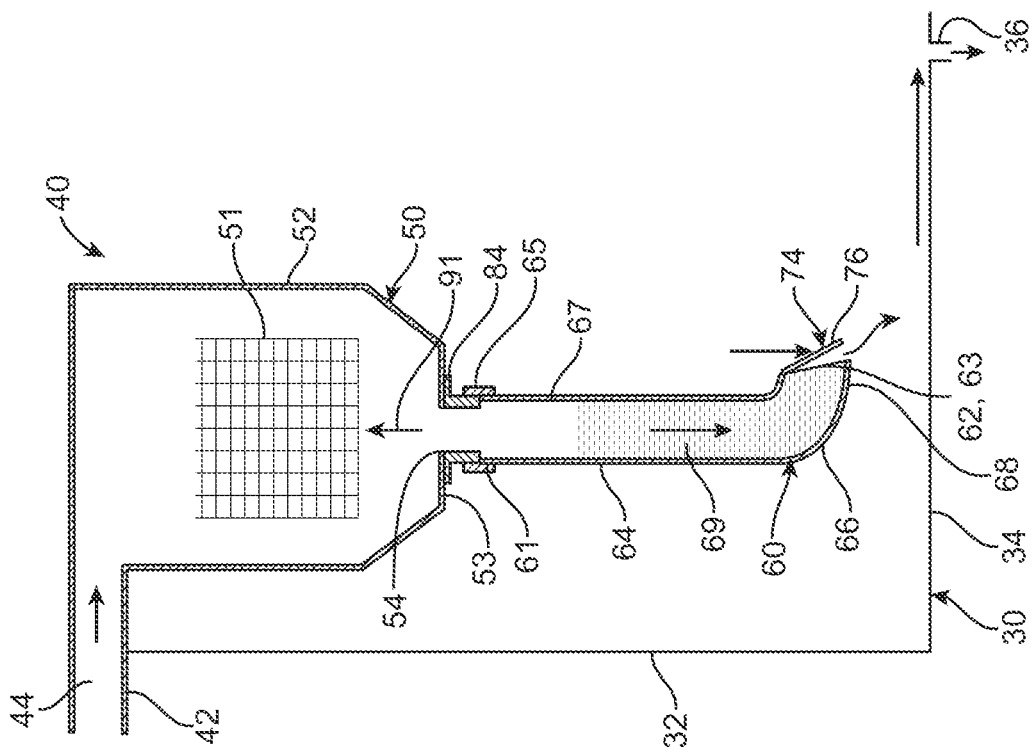
FIG. 5B is a schematic, cross-sectional view of the inlet system and the engine compartment of FIG. 5A with the flapper door in a closed position.
Figure 8:
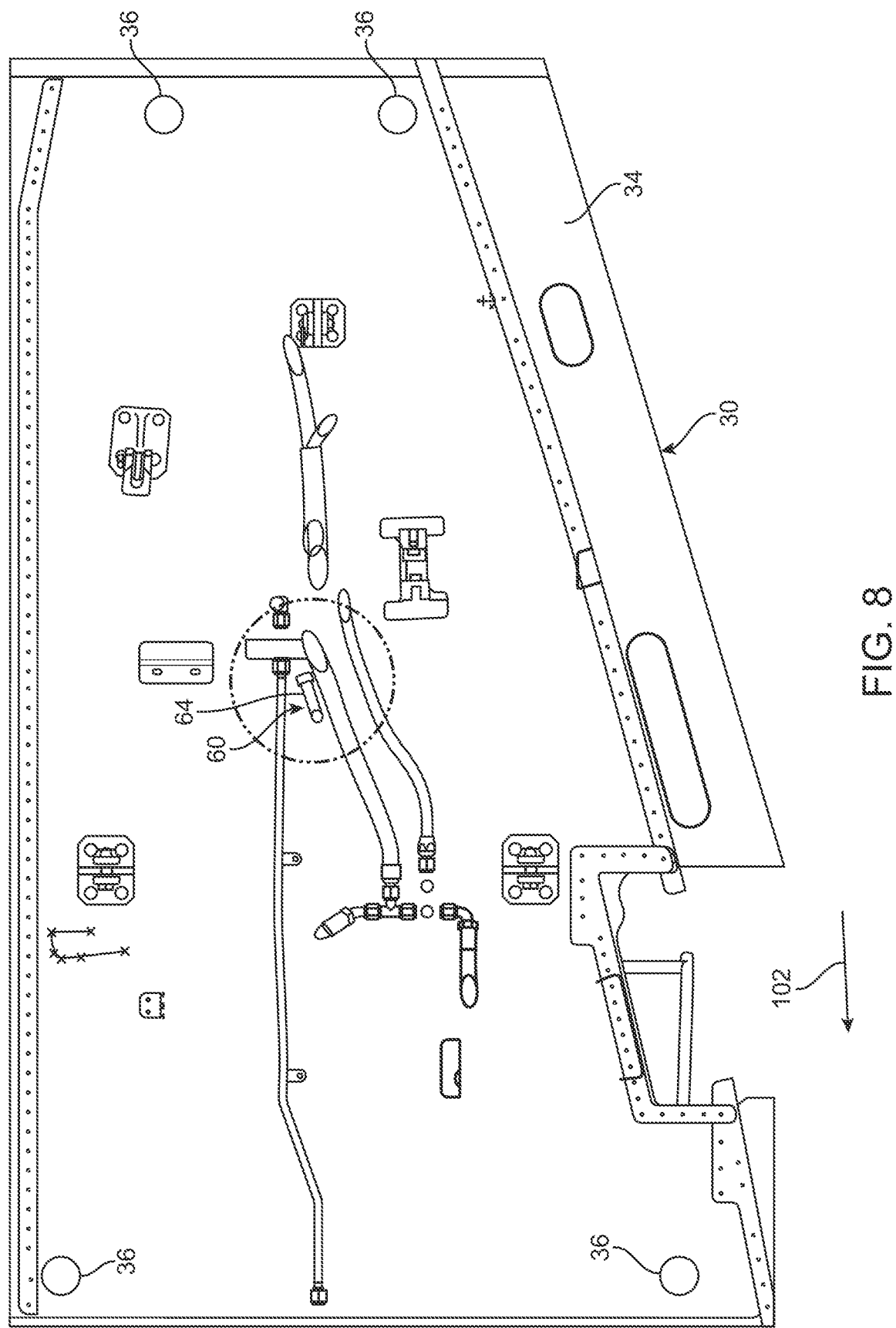
FIG. 8 is a top view of the drain assembly, looking down to the floor of the engine compartment of the engine system of FIG. 2.

The engine bay or compartment 30 is configured to house or contain the engine 22 and at least a portion of the inlet system 40. The engine compartment 30 includes a forward wall 32 (that may be a substantially vertical side wall) and a floor 34, both of which form part of the fire zone boundary (i.e., a firewall). As shown in FIGS. 5A-5B and 8, the floor 34 defines at least one drain scupper or floor drain 36 to drain liquid out from within the interior of the engine compartment 30, in line with civil certification regulations. The engine compartment 30 may be a previously existing engine compartment (with previously-existing floor drain(s) 36), and the drain assembly 60 may be retrofit into an existing engine system. The interior of the engine compartment 30 refers to the area within the engine compartment 30 and outside of the inlet system 40. As shown in FIG. 8, the various floor drains 36 may be a variety of different distances from the drain tube 64 provided liquid can flow from the drain assembly 60 to at least one of the floor drains 36. For example, the floor drains 36 are at lower elevation than the drain assembly 60.

Inlet System

The rotorcraft turbine inlet system 40 is configured to draw air into the engine 22 and extends through the forward wall 32 of the engine compartment 30 and into the interior of the engine compartment 30. As shown in FIG. 2, the inlet system 40 includes an inlet duct 42, an inlet particle separator duct 46, an engine inlet plenum assembly 50, and a drain assembly 60.

As shown in FIGS. 2 and 5A-5B, the inlet duct 42 defines an inlet or intake 44 and extends through the forward wall 32 of the engine compartment 30 (and thus through the firewall) and mates with the engine 22 to provide fluid to the engine 22.

The inlet duct 42 extends along the top portion of the engine 22 (above the engine 22). The inlet plenum assembly 50 and the inlet particle separator duct 46 each branch off from the inlet duct 42 into two different directions (as shown in FIG. 2). In particular, the inlet particle separator duct 46 continues to extend along the top portion of the engine 22, and the inlet plenum assembly 50 extends around the side and bottom portions of the engine 22.

Inlet Plenum Assembly

The inlet plenum assembly 50 is a radial inlet assembly that includes an inlet plenum 52 that defines a low accumulation point within the engine compartment 30. Although one type of inlet plenum assembly is shown in the drawings and described herein, the drain assembly 60 may be used with (and compatible) various other types of inlet plenum assemblies that define a low accumulation point within the engine compartment.

Figure 3A:
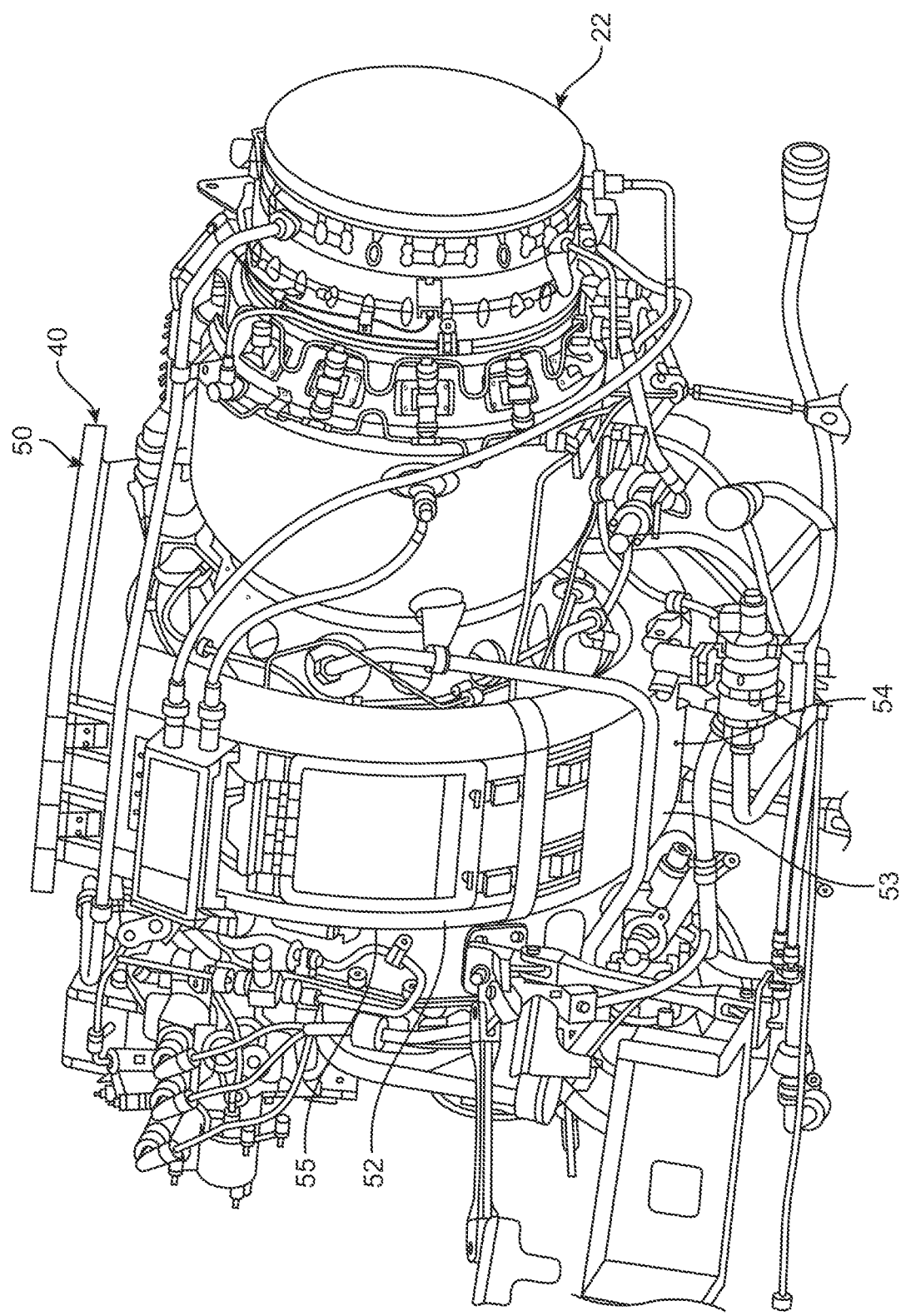
FIG. 3A is a perspective view of the engine system of FIG. 2 with the drain assembly removed.
Figure 3B:
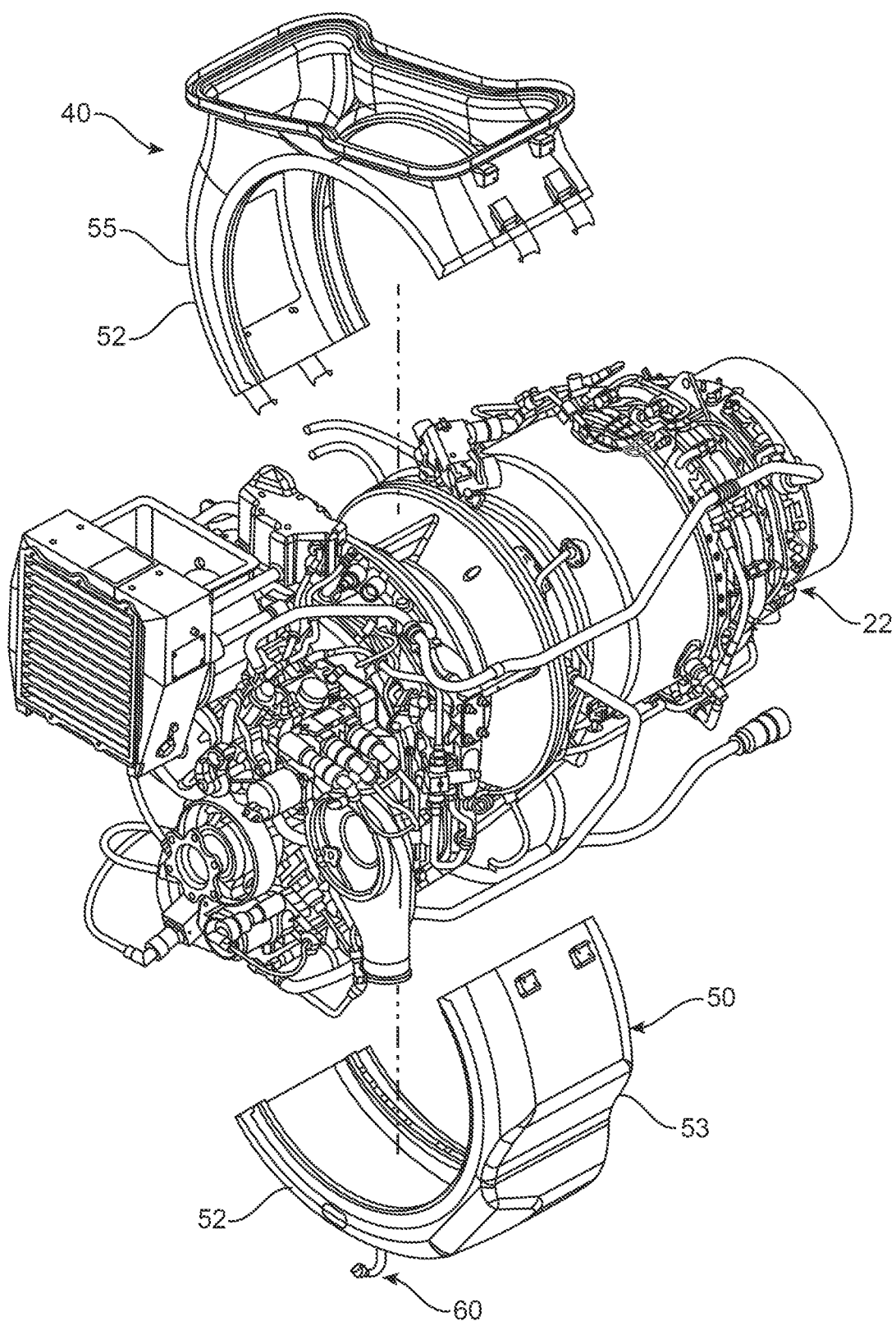
FIG. 3B is an exploded view of the inlet plenum assembly attachment to an engine of the engine system of FIG. 2.
Figure 4B:
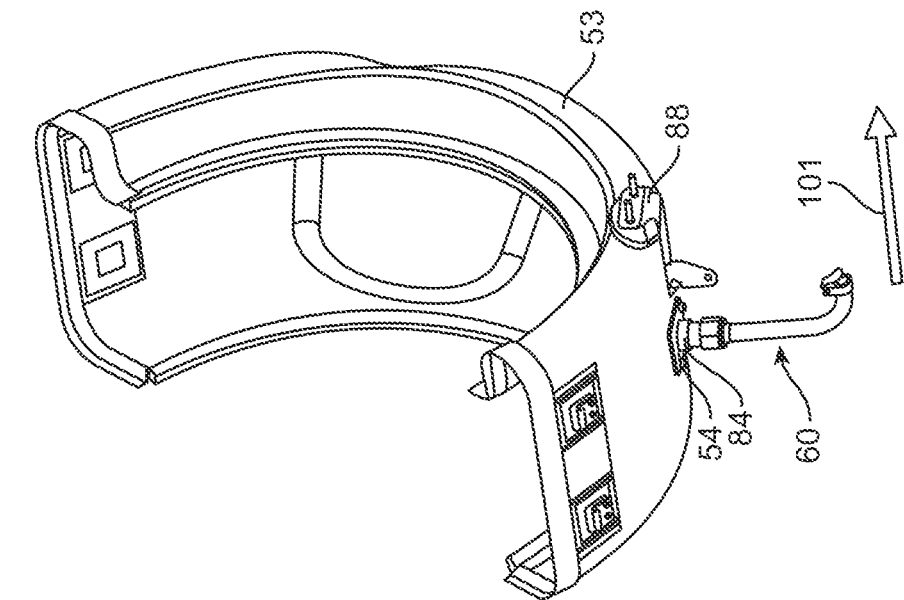
FIG. 4B is a perspective view of a lower portion of the inlet plenum assembly of FIG. 4A.
Figure 4A:
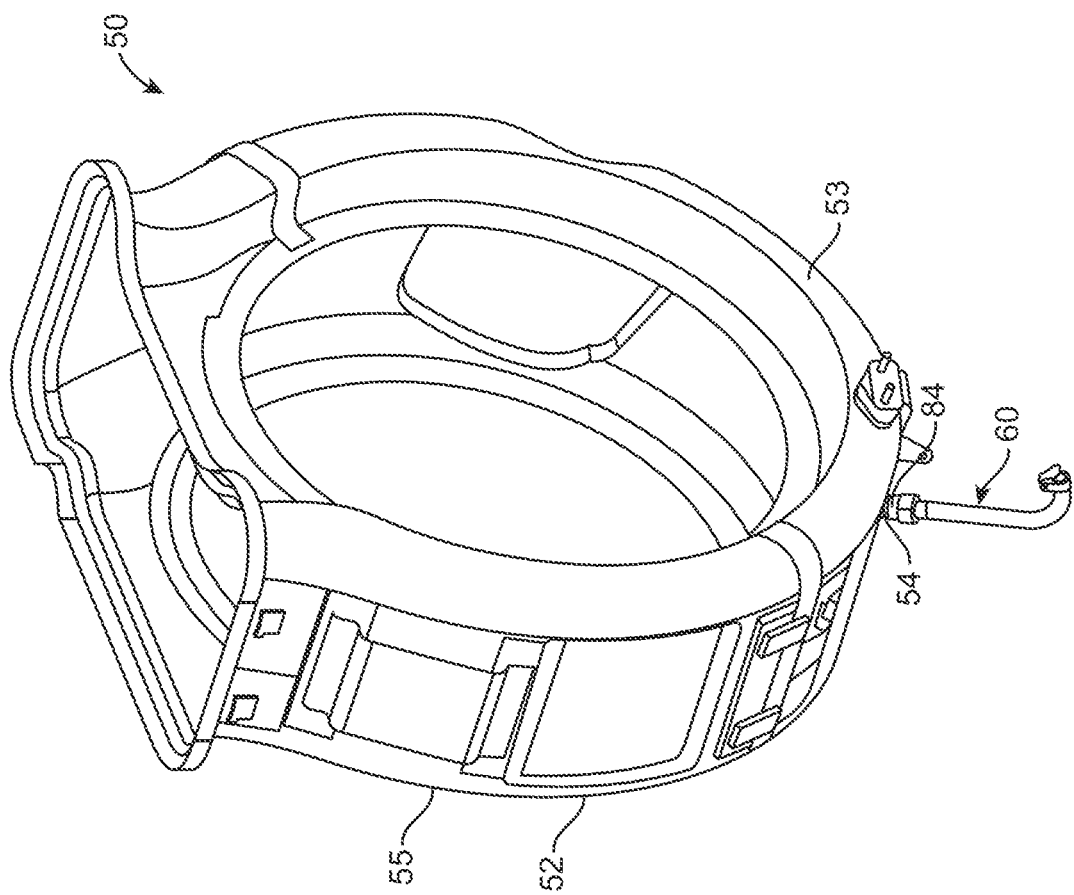
FIG. 4A is a perspective view of an inlet plenum assembly of the engine system of FIG. 2 with upper and lower portions of the inlet plenum assembly joined together.

The plenum 52 is a "wrap-around" plenum that extends radially around at least a portion of the engine 22. As shown in FIG. 4A, the plenum 52 comprises an upper half or portion 55 and a base lower half or portion 53 that together form a substantially circular opening that is configured to receive and extend around a portion of the engine 22. In particular, as shown in FIGS. 2-3B, the upper portion 55 extends around and above the middle of the engine 22, and the lower portion 53 extends around and below the engine 22. The inlet plenum assembly 50 surrounds an engine radial inlet screen 51 that is an integral part of the engine 22 (as shown in FIGS. 5A-5B).

The lower portion 53 of the plenum 52 has a low accumulation point or area below the engine 22 toward which liquid within the plenum 52 flows to be drained from the plenum 52. The low accumulation area of the lower portion 53 is at a lower elevation than the rest of the inlet plenum 52 and is positioned within the engine compartment 30. The low accumulation area defines an engine inlet plenum drain hole 54, as shown in FIG. 3A. Accordingly, the plenum drain hole 54 is positioned near or at the base or bottom of the engine 22 (below the engine 22) at the low accumulation area of the plenum 52 such that liquid flows toward (and through) the plenum drain hole 54 (and into the drain assembly 60, as described further herein). The plenum drain hole 54 may be a drilled hole in the low accumulation are of the plenum 52.

The low accumulation area of the inlet plenum 52 (and the engine compartment 30) may be deep within the fuselage. Accordingly, with conventional drainage systems, it is difficult to create a path or route to externally drain liquid from the inlet plenum. However, as described further herein, the drain assembly 60 allows the inlet plenum 52 to easily drain externally via the existing floor drains 36 in the engine compartment 30 without interrupting the fire wall boundary.

Drain Assembly

The inboard inlet plenum drain assembly 60 is a compact device that is fluidly attached to and installed on the lower portion 53 of the inlet plenum assembly 50 (as shown in FIGS. 4A-6A). In particular, the drain assembly 60 is positioned or mounted along the plenum drain hole 54. As shown in FIGS. 5A-5B, the drain assembly 60 is positioned within the engine compartment 30 and therefore is surrounded by engine compartment air that is heated by engine radiation. This heated air in the engine compartment precludes freezing and ice formation within and around the drain assembly 60.

The drain assembly 60 is configured to drain, direct, or deposit the accumulated liquid 69 inboard, directly from within the inlet plenum assembly 50 into the interior of the engine compartment 30 (in particular onto the floor 34), in an area that is outside of the inlet plenum assembly 50. Accordingly, the drain assembly 60 routes the liquid to flow inboard onto the floor 34 of the engine compartment 30 (from the drain tube 64) and subsequently through the existing floor drain(s) 36 to be removed from within the interior of the engine compartment 30. The drain assembly 60 is positioned entirely within the interior of the engine compartment 30. As shown in FIG. 5A, the accumulated liquid 69 may be, for example, a head or column of liquid within the drain tube 64. The liquid may be, for example only, inlet water from rain or condensation.

In contrast, typical drain assemblies drain liquid overboard, through separate drains (rather than utilizing existing drains). Due to the complexity within the engine compartment and numerous restrictions to maintain the safety of the rotorcraft, such drain assemblies do not drain flammable fluid into the engine compartment (which is a fire zone). Gas turbine engines with conventional drainage do not allow flammable fluid to drain out the engine inlet, but rather drain flammable fluid downstream of the engine inlet through combustor drains. Comparatively, as explained further herein, the drain assembly 60 drains non-flammable fluid (i.e., water) into the engine compartment 30 and is fireproof (and therefore maintains the fire zone within the engine compartment 30). The drain assembly 60 prevents flammable fluids, flames, or hot gases from moving backwards from the engine compartment 30 into the plenum 52, which would otherwise impact engine inlet air ingestion conditions or allow air or inert gases from the engine compartment 30 to be drawn into the inlet plenum assembly 50, which would affect the cooling and fire extinguishing design of the engine compartment 30.

The drain assembly 60 includes a drain tube 64, a flapper assembly 74, a drain fitting 84, and a collar 65. As described further herein, the drain assembly 60 is configured such that engine intake suction 91 (shown in FIGS. 5A-5B) generally does not impede the draining of the accumulated liquid 69 due to the water head pressure dynamics in the drain tube 64. To drain fluid from the inlet plenum assembly 50, the drain assembly 60 is positioned within the engine compartment 30 and the first tube end 61 of the drain tube 64 such that fluid can drain from within the inlet plenum assembly 50, through the drain assembly 60, into the engine compartment 30, and through at least one floor drain 36.

The drain tube 64 extends between a first tube end 61 and a second tube end 62 along the length of the drain tube 64, as shown in FIGS. 5A-7B. The drain tube 64 is positioned and configured such that liquid from the plenum 52 drains into the drain tube 64 through the first tube end 61 and drains out of the drain tube 64 through the second tube end 62, as shown in FIG. 5A. FIG. 4B shows the orientation of the drain tube 64 relative to the aft direction 101, and FIG. 6A shows the orientation of the drain tube 64 relative to the forward direction 102. As shown in FIG. 3B, the drain assembly 60 is shown in the forward-facing direction for clarity. However, the drain assembly 60 may be installed in the aft-facing direction 101, as shown in FIGS. 4B and 6A.

As shown in FIGS. 5A-6A, the drain tube 64 includes a substantially vertical portion 67 (that includes the first tube end 61), a substantially horizontal portion 68 (that includes the second tube end 62), and a curved portion 66 between and connecting the vertical portion 67 and the horizontal portion 68. The vertical portion 67, the horizontal portion 68, and the curved portion 66 extend in series along the length of the drain tube 64, between the first tube end 61 and the second tube end 62. The vertical portion 67 defines the first tube end 61, and the horizontal portion 68 defines the second tube end 62. The curved portion 66 provides a transition between the vertical portion 67 and the horizontal portion 68.

The vertical portion 67 and the horizontal portion 68 extend approximately 85-90° from each other. Accordingly, the first tube end 61 faces vertically upward, and the second tube end 62 faces horizontally sideways. This configuration allows liquid to flow downwardly out of the plenum 52 (and through the first tube end 61 and into the vertical portion 67), while keeping the flapper door 76 (which is along the second tube end 62) closed when not draining a liquid out from the plenum 52. As shown relative to the forward direction 102 in FIG. 6A, the horizontal portion 68 is facing away from (and further away from relative to the vertical portion 67) the front of the rotorcraft 10.

Figure 6A:
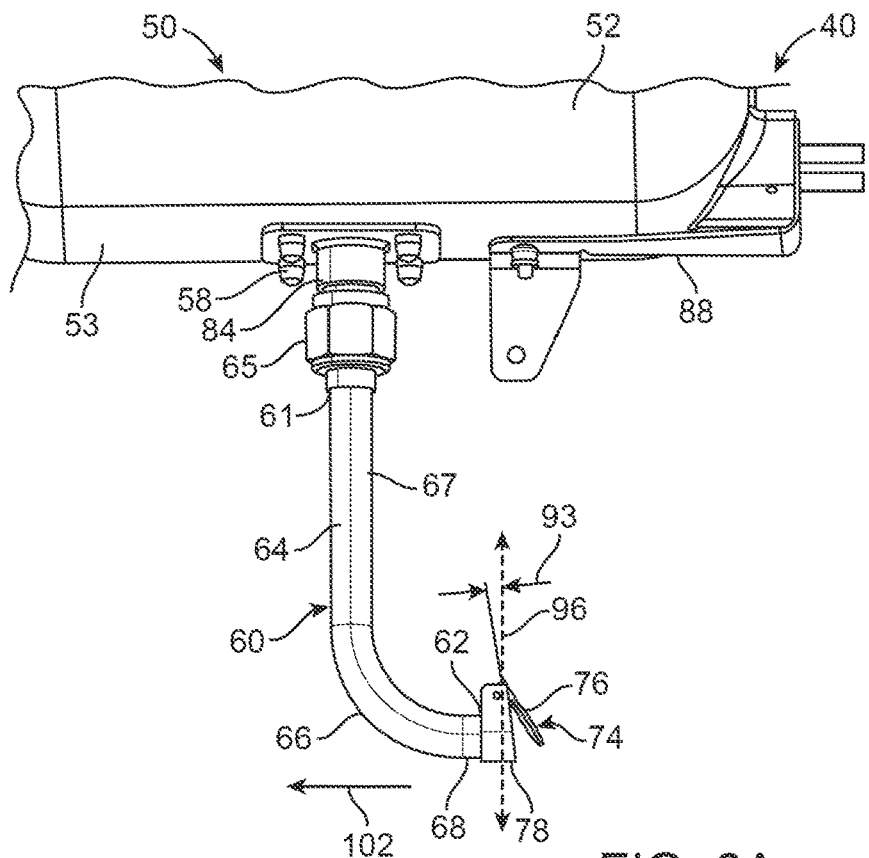
FIG. 6A is a side view of the drain assembly attached to the lower portion of the inlet system of the engine system of FIG. 2.
Figure 6B:
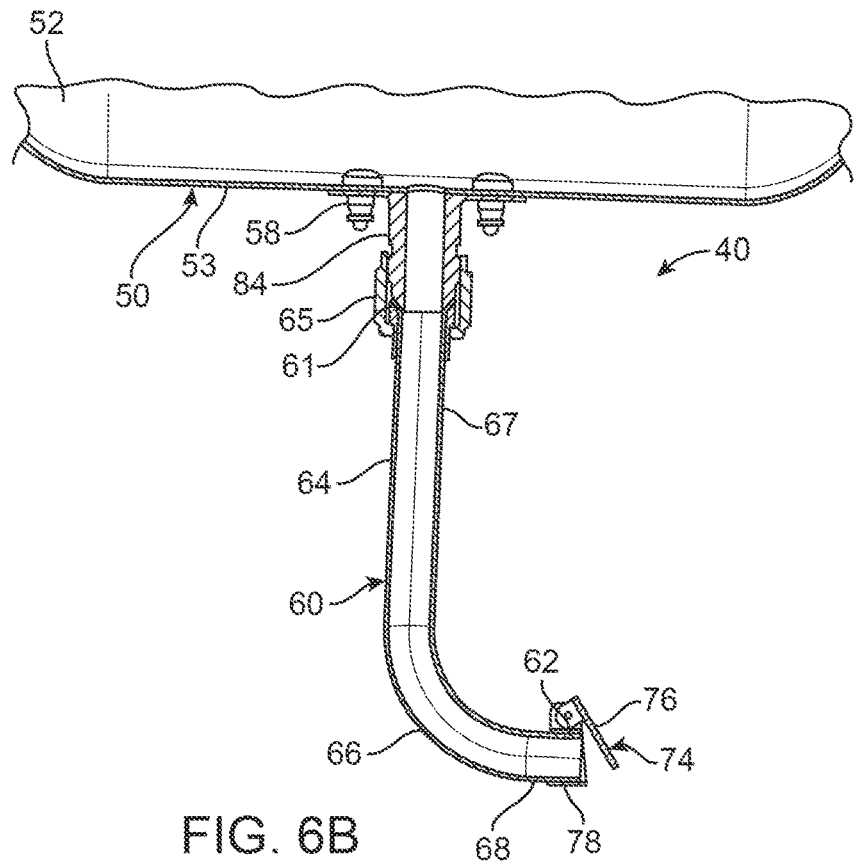
FIG. 6B is a cross-sectional view of FIG. 6A.
Figure 7A:
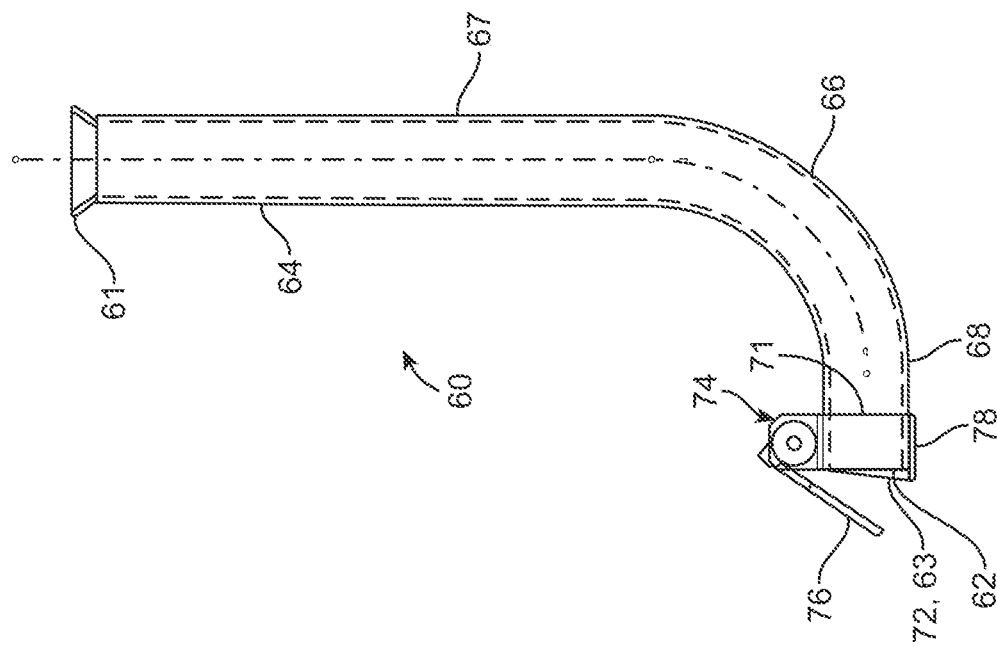
FIG. 7A is a perspective view of a drain assembly of the engine system of FIG. 2.
Figure 7B:
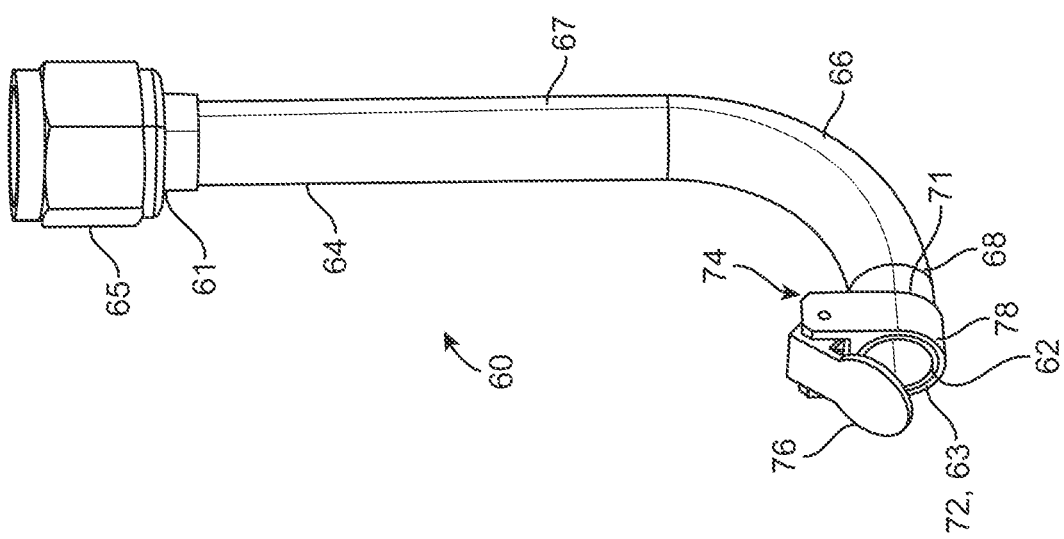
FIG. 7B is a side view of the drain assembly of the engine system of FIG. 2.

The first tube end 61 is configured to fluidly attach to the drain fitting 84 (as shown in FIGS. 5A-6A). In particular, the first tube end 61 is aligned with the drain fitting 84, and the drain fitting 84 may be at least partially positioned within the drain tube 64 (as shown in FIGS. 5A-5B and 6B). The first tube end 61 may optionally be flared (as shown in FIGS. 6B and 7B) such that a lower end of the drain fitting 84 fits at least partially within the first tube end 61.

The drain fitting 84 is configured to attach the drain tube 64 to the plenum 52 of the inlet plenum assembly 50. Accordingly, a top end of the drain fitting 84 is configured to fluidly attach to the lower portion 53 of the plenum 52 along the area of the plenum 52 defining the plenum drain hole 54, and a bottom end of the drain fitting 84 is configured to fluidly attach to the first tube end 61 of the drain tube 64, as shown in FIGS. 5A-6B. The drain fitting 84 may surround and be axially aligned with the plenum drain hole 54.

Figure 4C:
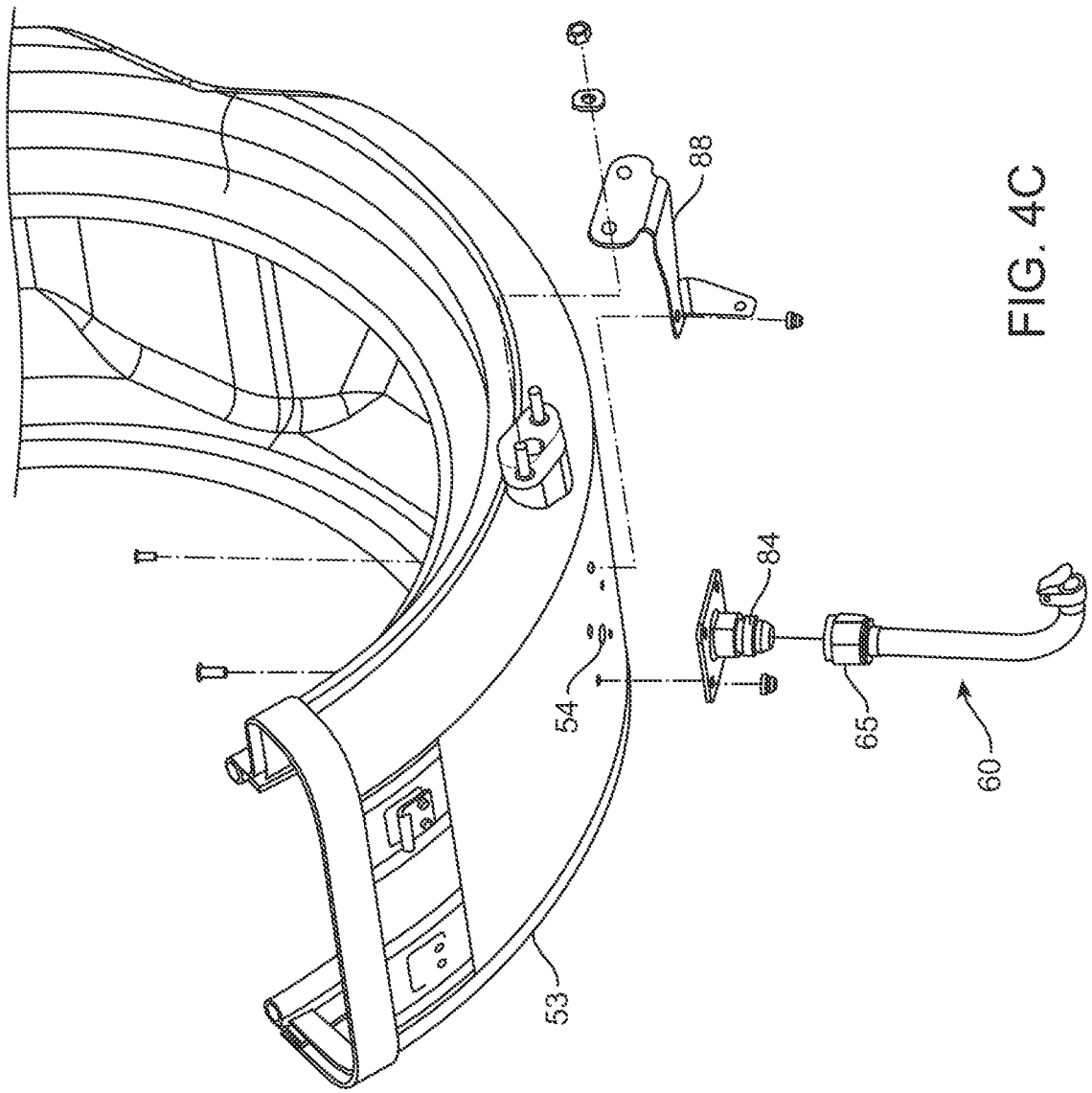
FIG. 4C is an exploded view of the drain assembly attachment to the lower portion of the inlet plenum assembly of FIG. 4A.

The drain fitting 84 is attached to the plenum 52 through at least one (preferably a plurality of) fasteners 58 (for example, various HI-LOK™ fasteners made by LISI Aerospace of Torrance, CA, pins, pin washers, and collars, as shown in FIG. 4C). According to one embodiment, the drain fitting 84 may be a corrosion resistant fitting made of stainless steel, for example. An electrical harness support bracket 88 may also be installed onto the lower portion 53 of the plenum 52 with various fasteners, such as various washers, nuts, and collars (as further shown in FIG. 4C).

As shown in FIGS. 5A-7A, the nut or collar 65 attaches the drain tube 64 to the drain fitting 84. The collar 65 is positioned around the outside of the first tube end 61 of the drain tube 64 and the outside of the lower end of the drain fitting 84.

Flapper Assembly

The flapper assembly 74 is positioned along and attached to the drain tube 64 (in particular along the second tube end 62). As described further herein, the flapper assembly 74 allows liquid to drain out from the drain assembly 60 (in a direction flowing from the first tube end 61 to the second tube end 62 of the drain tube 64) (as shown in FIG. 5A) and prevents or inhibits fluid, engine compartment gases, or flames from flowing backwards from the interior of the engine compartment 30 into the drain assembly 60 (and thus into the inlet plenum assembly 50) through the second tube end 62 of the drain tube 64 (as shown in FIG. 5B).

As shown in FIGS. 6A-7B, the flapper assembly 74 includes a flapper door 76 and a base 78. The flapper door 76 is hingeably and movably attached to the base 78 (and therefore is hingeably and movably attached to the drain tube 64). (Alternatively, the flapper door 76 may be hingeably and movably attached directly to the drain tube 64, instead of including the base 78.) The hinge (to attach the flapper door 76 and the base 78 or drain tube 64) may optionally be positioned between the first base end 71 and the second base end 72, above the horizontal portion 68 of the drain tube 64.

The drain assembly 60 (in particular the flapper assembly 74) avoid the use of a spring since the drain tube would otherwise have a longer tube length with a spring (to provide more force from the fluid head to overcome the spring force to open the flapper door and drain out from the drain tube) and therefore need more clearance. Furthermore, springs may be unreliable since springs may jam, corrode, or break and increase the weight, complexity, and cost of the configuration. The drain assembly 60 (in particular the flapper assembly 74) also does not use or rely on any valves.

The base 78 is attached to and positioned along or at the second tube end 62. As shown in FIGS. 7A-7B, the base 78 includes and extends between a first base end 71 and a second base end 72. The second base end 72 is closer to the second tube end 62 along the length of the drain tube 64 than the first base end 71. The flapper door 76 is hingeably attached to the base 78 (for example, along an area between the first base end 71 and the second base end 72 and above the horizontal portion 68 of the drain tube 64) such that the flapper door 76 is positionable along or near the second base end 72 to close off the second tube end 62.

The flapper door 76 allows fluid to drain from the drain tube 64 in the direction from the drain tube 64 into the engine compartment 30 (and prevents fluid, engine compartment gases, or flames from moving in the opposite direction). The flapper door 76 is movable between an open position (as shown in FIG. 5A) and a closed position (as shown in FIG. 5B). The flapper assembly 74 is open in the open position only when the accumulated liquid 69 is present within the drain assembly 60 to be drained and is being discharged or drained from the drain tube 64 of the inlet system 40 into the interior of the engine compartment 30 (in a direction opposite the engine intake suction 91, as shown in FIG. 5A). When the accumulated liquid 69 is in the drain tube 64, the accumulated liquid 69 moves through and within the drain tube 64 in the downward direction (from the first tube end 61 to the second tube end 62), as shown in FIG. 5A. The force of gravity on the accumulated liquid column 69 automatically moves the flapper door 76 into the open position to allow the accumulated liquid 69 to drain out of the drain tube 64. In the open position, at least a portion of the flapper door 76 (in particular a lower portion that is opposite the hinge) is angled away and spaced apart from the angled flapper seat 63 to allow the accumulated liquid 69 to drain out of the drain tube 64 (between the flapper door 76 and the angled flapper seat 63).

When there is no liquid 69 to be drained from the drain tube 64, the flapper door 76 automatically moves to the closed position by means of the force of gravity on the weight on the flapper door 76, as shown in FIG. 5B. In the closed position, the flapper door 76 is closed, extends along, abuts, or sealed against an angled flapper seat 63, closing off the second tube end 62 and thereby preventing fluid, engine compartment gases, or flames from moving from the interior of the engine compartment 30 into the plenum 52 (specifically between the drain tube 64 and the interior of the engine compartment 30) through the second tube end 62. In particular, the fluid, engine compartment gases, or flames do not move from the engine compartment 30 to the drain tube 64 through the second tube end 62 when the flapper door 76 is in the closed position. In the closed position, the flapper door 76 seals with the angled flapper seat 63 and acts as a wall or barrier to prevent air from being suctioned from the interior of the engine compartment 30 into the plenum 52 (and the rest of the inlet system 40) due to the engine intake suction 91.

The angled flapper seat 63 is the endmost portion of the drain tube 64 and/or the base 78 that provides an area for the flapper door 76 to directly close onto and seal with. Depending on whether the second tube end 62 or the second base end 72 extends further along the length of the drain assembly 60 (or if the second tube end 62 and the second base end 72 are aligned with each other), the second tube end 62 defines the angled flapper seat 63 (as shown in FIGS. 5A-5B) and/or the outer surface of the second base end 72 defines the angled flapper seat 63 (as shown in FIGS. 7A-7B). In the closed position, the flapper door 76 extends along and parallel to the angled flapper seat 63, as shown in FIG. 5B.

In the closed position, the angled flapper seat 63 positions the flapper door 76 at an oblique angle 93 relative to a vertical axis 96 of the drain tube 64 (as shown in FIG. 5B), where the vertical axis 96 extends along the vertical portion 67 of the drain tube 64. Accordingly, the angled flapper seat 63 is at an oblique angle 93 (as shown in FIG. 6A) relative to the vertical axis 96 such that, when the flapper door 76 is closed, the flapper door 76 is also at the oblique angle 93. By positioning the flapper door 76 at the oblique angle 93 in its closed position, the flapper door 76 remains closed during rotorcraft pitch changes, when the engine 22 is off, and when there is no liquid draining from the drain tube 64 by virtue of gravity (including for non-level aircraft flight attitudes). The angled flapper seat 63 is angled upward to keep the flapper door 76 in the closed position. In the open position (as shown in FIG. 5A), the flapper door 76 is at an angle relative to the vertical axis 96, where the angle in the open position is larger than the oblique angle 93 in the closed position (measured between the vertical axis 96 and the vertically-lower side of the flapper door 76).

The angled flapper seat 63 may be at a variety of different oblique angles 93 (and therefore positions the flapper door 76 accordingly when in the closed position), according to the desired configuration and the particular application. In particular, the oblique angle 93 of the angled flapper seat 63 may be designed according to the pitch range of the rotorcraft 10, the engine suction, and the force of the fluid head such that the flapper assembly 74 will not open during engine operation unless there is a quantity of fluid in the drain tube 64. According to various embodiments and as an example only, the oblique angle 93 is in a first range, e.g., between approximately 5° to approximately 12° (relative to a vertical axis). The oblique angle 93 of the angled flapper seat 63 may be set to the maximum pitch angle of the rotorcraft 10.

In the absence of liquid 69 being drained from the drain tube 64 of the inlet system 40 into the interior of the engine compartment 30 (or in the absence of any accumulated liquid 69 within the drain tube 64 to be drained from the drain tube 64), the flapper door 76 is biased and automatically moves toward the angled flapper seat 63 (and toward the second base end 72) to the closed position and remains closed (in the closed position). As shown in FIGS. 5A-5B, the weight of the flapper door 76, the engine intake suction 91, and the oblique angle 93 of the angled flapper seat 63 draw, move, or pivot the flapper door 76 into the closed position and toward the second tube end 62 (and keep the flapper door 76 in the closed position), closing off the drain assembly 60 along the second tube end 62. In particular, the engine intake pressure or suction 91 moves in an upward direction within the drain tube 64 (in a direction from the drain tube 64 and further into the plenum 52), which draws the flapper door 76 toward the angled flapper seat 63 and into the closed position. The weight of the flapper door 76 causes the flapper door 76 to move in a downward direction (and thus toward the angled flapper seat 63). Since the angled flapper seat 63 is angled upward, the flapper door 76 stays closed against the angled flapper seat 63 (with the help of the weight of the flapper door 76 and the engine intake suction 91), including when the aircraft is not level due to flight attitude.

By closing the flapper door 76 (and thus closing off the second tube end 62) and by remaining closed when liquid 69 is not draining from the inlet system 40, the flapper assembly 74 prevents a backflow of any fluid (including any air, fire, hot engine compartment gases, flammable fluids, inert gas, or flames) from flowing, moving, or being sucked in the reverse direction, backward out from within the interior of the engine compartment 30, into the drain assembly 60, and subsequently into the plenum 52 or the rest of the inlet system 40. Accordingly, the flapper assembly 74 maintains a fireproof seal along the second tube end 62 and maintains separate compartments (i.e., the inlet system 40 and the interior of the engine compartment 30) within the engine 22 in the closed position. The drain assembly 60 maintains the engine compartment fire zone and firewall integrity, is fireproof, does not disrupt the airflow within the engine 22, and maintains the sealed integrity of the firewall boundary of the engine compartment 30 (and thus meets civil certification regulations). Additionally, this configuration prevents interference with airflow cooling flow dynamics or fire suppression inert gas dynamics within the engine compartment 30.

The drain assembly 60 and the plenum drain hole 54 are sized relative to each other to ensure proper drainage of the liquid 69 out from the drain assembly 60 and into the interior of the engine compartment 30, against the engine intake suction 91. In particular, the drain assembly 60 is sized such that the force of the weight of the liquid in the drain tube 64 is greater than the suction force (e.g., the engine intake suction 91) of air being drawn into the inlet system 40. Accordingly, the engine intake suction 91 will not keep the liquid suspended in the drain tube 64 and will not prevent the liquid from draining out from the drain tube 64 and into the interior of the engine compartment 30.

For example, the inner diameter ratio of the drain tube 64 and the drain fitting 84 achieve fluid head characteristics sufficient to overcome engine suction while minimizing the length of the drain tube 64 (such that the drain tube 64 is short enough to fit in the tight space constraints at the low point of the inlet system 40). As shown in FIGS. 5A-5B, the inner diameter of the drain tube 64 (in particular along the first tube end 61) is larger than the inner diameter of the drain fitting 84 and the plenum drain hole 54, which allows the accumulated liquid 69 within the drain tube 64 of the drain assembly 60 to pull harder than and overcome the suction pressure (as shown by the engine intake suction 91 in FIGS. 5A-5B) to drain out from the drain tube 64 into the interior of the engine compartment 30. Since the inner diameter of the drain tube 64 is larger than the inner diameter of the drain fitting 84 and the plenum drain hole 54, the length of the drain tube 64 can be decreased by the ratio of the inner diameter of the drain fitting 84 and the plenum drain hole 54 to the inner diameter of the drain tube 64 while still maintaining a sufficient gravity force necessary for the accumulated liquid 69 to overcome the engine intake suction 91 and drain from the drain assembly 60. Optionally, additional length may be added to the drain tube 64 to ensure that the gravity force of the accumulated liquid 69 not only overcomes the force of engine intake suction 91, but also has enough force to push the flapper door 76 open and overcome friction forces. Optionally, the inner diameter of the drain fitting 84 is approximately the same size as the inner diameter of the plenum drain hole 54.

By accommodating the hydraulic forces with the ratio between the inner diameters of the drain tube 64, the drain fitting 84, and the plenum drain hole 54, the length of the drain tube 64 is reduced and kept relatively short. Accordingly, the drain tube 64 is uniquely compatible with a wide range of environments, where tight clearance may otherwise be an issue. The drain tube 64 can accommodate tight clearances (in particular within the engine compartment 30) and is less susceptible to clogging. Comparatively, if the inner diameters of the drain fitting 84, the plenum drain hole 54, and the drain tube 64 were the same and with the same hydraulic pressure condition, the length of the drain tube 64 would have to be significantly longer for the accumulated liquid 69 to overcome the engine intake suction 91 and drain from the drain tube 64, but the drain tube 64 may not have sufficient clearance within the interior of the engine compartment 30 to be sufficiently long.

For the drain assembly 60 to properly hydraulically work, the drain tube 64 may have a range of lengths, and the inner diameters of the drain fitting 84, the plenum drain hole 54, and the drain tube 64 may have a range of sizes in accordance with the length of the drain tube 64. According to one embodiment and as an example only, the drain tube 64 may have a diameter of approximately 0.3-0.6 inches and a maximum wall thickness of between approximately 0.25-0.5 in.

According to one embodiment and as an example only, the vertical portion 67 of the drain tube 64 is approximately a first length, the vertical distance between the first tube end 61 and the midline of the horizontal portion 68 is greater than the first length, the horizontal distance between the second tube end 62 and the midline of the vertical portion 67 is less than the first length, and the radius of the curved portion 66 between the vertical portion 67 and the horizontal portion 68 is less than the horizontal distance.

The following measurements and dimensions within the inlet system 40 are according to various embodiments and are provided as a non-limiting examples. In particular, according to one embodiment, the engine intake suction 91 may be different from atmospheric pressure during engine operation. The downward force of gravity on a column of water per square inch of the cross-sectional area of the drain tube 64 is (density of water)*(force of the gravity)*(height of the column of water).

As a further example, if the drain tube 64 has the same inner diameter of the drain fitting 84 and the plenum drain hole 54, the height of the column of water within the drain tube 64 reaches a given height to overcome the force of the engine intake suction 91. The inner diameter of the drain tube (and thus the cross-sectional area of the drain tube 64) is sized such that the gravitational force overcomes the upward suction force. In particular, the inner diameter of the drain tube is larger than the inner diameter of the drain fitting and the plenum drain hole. By this configuration, the drain tube 64 is thus configured to overcome the upward suction force, and the length required for the drain tube to drain effectively is reduced.

Although each of the various aspects, features, components, and configurations are not separately described for each embodiment, each of the various embodiments disclosed herein may have any of the aspects, features, components, and configurations of the other embodiments, except where noted otherwise.

As utilized herein, the terms "approximately," "substantially," and similar terms are intended to have a broad meaning in harmony with the common and accepted usage by those of ordinary skill in the art to which the subject matter of this disclosure pertains. The terms "approximately" and "substantially" as used herein generally refers to ±5% or ±10% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied according to alternative embodiments. Other substitutions, modifications, changes and omissions may also be made in the design, operating conditions and arrangement of the various exemplary embodiments without departing from the scope of the present invention.

What is claimed is:

1. An aircraft comprising:
   an engine; and
   a drain assembly, comprising:
      an inlet plenum assembly to provide air to the engine;
      a drain tube extending between a first tube end and a second tube end, the first tube end fluidly attached to the inlet plenum assembly; and
      a flapper assembly positioned along the second tube end and comprising a flapper door, the flapper door configured to allow fluid to drain from the drain assembly to an engine compartment of the engine when pressure produced by the fluid in the drain tube overcomes engine suction of the engine,
      the flapper door being further configured to prevent fluid, gases, or flames from flowing into the drain assembly through the second tube end of the drain tube.

2. The aircraft of claim 1, wherein the flapper door is movable between an open position and a closed position, wherein the flapper door allows fluid to drain from the drain tube in the open position and the flapper door automatically moves to the closed position when fluid is not draining from the drain tube.

3. The aircraft of claim 2, wherein, in the closed position, the flapper door seals against an angled flapper seat and prevents fluid from moving between the drain tube and the engine compartment through the second tube end of the drain tube.

4. The aircraft of claim 3, wherein, in the closed position, the angled flapper seat positions the flapper door at an angle relative to a vertical axis that extends along a vertical portion of the drain tube.

5. The aircraft of claim 3, wherein the flapper assembly comprises a base attached to the second tube end, the flapper assembly hingeably attached to the base, wherein the base defines the angled flapper seat.

6. The aircraft of claim 3, wherein the second tube end defines the angled flapper seat.

7. The aircraft of claim 1, wherein the drain tube comprises a substantially vertical portion and a substantially horizontal portion that extend between the first tube end and the second tube end.

8. The aircraft of claim 1, further comprising the engine compartment, the engine compartment defining a firewall for the engine, the firewall having a floor, the floor defining at least one drain, the drain tube and the flapper assembly positioned within the engine compartment and suspended above the at least one drain by the inlet plenum assembly.

9. A aircraft comprising:
   an engine; and
   a drain assembly, comprising:
      an inlet plenum assembly to provide air to the engine;
      a drain fitting fluidly attached to the inlet plenum assembly;
      a drain tube extending between a first tube end and a second tube end, the first tube end configured to fluidly attach to the drain fitting, wherein an inner diameter of the drain fitting is smaller than an inner diameter of the drain tube; and
      a flapper assembly positioned along the second tube end and comprising a flapper door configured to allow fluid to drain from the drain tube when pressure produced by the fluid in the drain tube overcomes engine suction of the engine.

10. The aircraft of claim 9, wherein the drain fitting is positioned at least partially within the drain tube.

11. The aircraft of claim 9, wherein the flapper door is configured to inhibit fluid from flowing into the drain tube through the second tube end of the drain tube.

12. The aircraft of claim 11, wherein the flapper door is movable between an open position and a closed position, wherein the flapper door allows fluid to drain from the drain tube in the open position and the flapper door automatically moves to the closed position when fluid is not draining from the drain tube.

13. The aircraft of claim 12, wherein, in the closed position, the flapper door seals against an angled flapper seat and prevents fluid from moving between the drain tube and an engine compartment that the drain tube is positioned within through the second tube end of the drain tube.

14. The aircraft of claim 9, wherein the drain tube comprises a substantially vertical portion and a substantially horizontal portion that extend between the first tube end and the second tube end.

15. A method of draining fluid from an inlet plenum assembly of an engine system, the method comprising:
   positioning a drain assembly within an engine compartment, wherein the drain assembly comprises a drain tube and a flapper assembly, wherein the drain tube extends between a first tube end and a second tube end, wherein the flapper assembly is positioned along the second tube end and comprises a flapper door; and
   fluidly attaching the first tube end of the drain tube to the inlet plenum assembly that is fluidly coupled to an engine such that fluid can drain from within the inlet plenum assembly, through the drain assembly, into the engine compartment, and through at least one floor drain defined by a floor of the engine compartment when pressure produced by the fluid in the drain tube overcomes engine suction.

16. The method of claim 15, wherein the fluid drains directly from the drain assembly onto the floor of the engine compartment to flow to the floor drain.

17. The method of claim 15, wherein the drain assembly is positioned entirely within the engine compartment.

18. The method of claim 15, further comprising preventing fluid from flowing into the drain tube through the second tube end of the drain tube with the flapper door.

19. The method of claim 18, further comprising moving the flapper door between an open position and a closed position, wherein the flapper door allows fluid to drain from the drain tube in the open position, further comprising automatically moving the flapper door to the closed position when fluid is not draining from the drain tube.

20. The method of claim 19, further comprising sealing the flapper door against an angled flapper seat and preventing fluid from moving between the drain tube and the engine compartment through the second tube end of the drain tube in the closed position.

21. The method of claim 15, further comprising fluidly attaching the first tube end to a drain fitting and fluidly attaching the drain fitting to the inlet plenum assembly, wherein an inner diameter of the drain fitting is smaller than an inner diameter of the drain tube.

22. The method of claim 21, wherein, the ratio between the inner diameter of the drain fitting and the inner diameter of the drain tube, a weight of the flapper door, and an angle of an angled flapper seat that the flapper door is configured to seal against are configured such that when liquid is present in the drain tube, the flapper door moves to an open position, and the liquid overcomes engine suction and drains through the second tube end of the drain tube, and when liquid is not present in the drain tube, the flapper door will remain in a closed position for both level and pitch angle flight attitudes.

\* \* \* \* \*